3,217,736
FULL PRESSURE SUIT RELIEF VALVE
Waldemar Emil Voss, Kenton, Middlesex, England, assignor to L. Adams Limited, London, England, a corporation of the United Kingdom
Filed Oct. 19, 1962, Ser. No. 231,794
1 Claim. (Cl. 137—343)

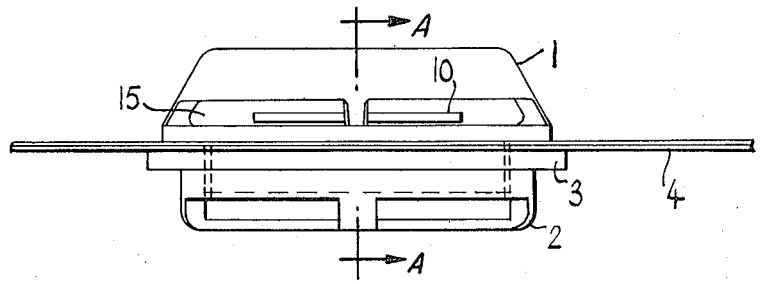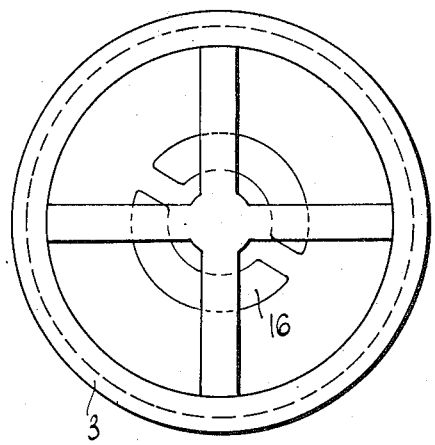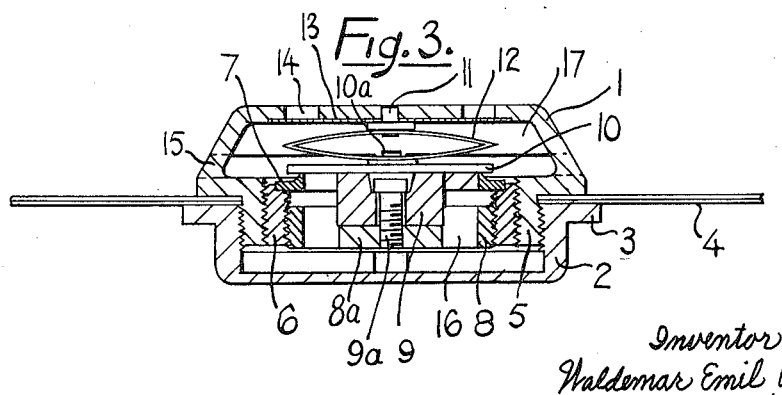

This invention relates to pressure relief valves and has as its main object to provide such a valve for use in pressurised suits or clothing normally worn by aircrews.

With such garments the wearer is generally covered from head to toe and it is essential that means be provided whereby, in the event of a fault occurring in the supply of pressure fluid to the garment, excessive pressure in the garment can be very rapidly relieved. It is, therefore, another object of this invention to provide a pressure relief valve which will operate almost instantaneously to prevent a differential pressure across the garment wall exceeding a safe value in the event of a failure of the normal garment pressure control system and thus allow the fluid pressure to escape at a very high rate from the garment; it is another object to provide such a valve which is of relatively small dimensions in relation to the amount of pressure fluid which it can pass, and one which is of light weight.

According to the present invention a pressure relief valve comprises a valve body bored to provide an inlet for fluid under pressure, at least two outlets in said body, a valve seat within said body, a magnet adjustably mounted within said seat, a magnetic valve plate and securing means for positioning the valve seat and magnet within said body and for clamping a layer of fabric forming part of a pressurised suit or garment between said means and said valve body.

Preferably the valve body is of circular formation and preferably four fluid pressure outlets are provided in the form of slots adjacent the top of the valve body, the outlets tapering outwardly for easy flow, the slots being spaced around the periphery of the valve body.

Preferably also a light spring is provided to bias the valve plate on to its seating, the spring preferably being of double leaf formation with interweaving ends to provide for correct location of the valve plate and to prevent vibration of the spring.

Preferably also the top of the valve body is vented for evacuation of air in the valve chamber above the valve plate, which evacuation is essential when said valve plate flies open.

Preferably also the valve seating is of knife-edge formation to allow for the correct rapid location of the valve plate when closing.

A preferred form of pressure relief valve according to the present invention is illustrated in the accompanying drawing which shows the valve magnified to about twice its actual size. In the said drawing:

FIGURE 1 is a front elevation of a relief valve embodying the invention;

FIGURE 2 is an underside plan view of the construction shown in FIGURE 1 with some parts omitted; and FIGURE 3 a section on the line A—A FIGURE 1.

Referring to the drawing, the pressure relief valve comprises a valve body 1 in screw threaded connection with a member 2 provided with a flange 3. This arrangement allows for a layer of fabric 4 forming part of a pressurised garment to be firmly clamped in the valve body so that the relief valve is securely mounted on the garment.

The valve body is formed internally with a threaded flange 5 for connection with an annulus 6 terminating at the top in a knife-edged valve seating 7; the annulus 6 is also internally threaded for engagement by a ring structure 8 mounting a magnet 9. The ring 8 has a hub 8a to which the magnet 9 is secured by a screw 9a. The valve plate which is of magnetic material is shown at 10. Carried from the inner surface of the valve casing 1 by a pin 11 is a double leaf spring 12 with interlocking ends and mounted on the pin 11 is a gauze 13 which is normally held in contact with the undersurface of the top of the valve body, which is apertured at 14 to provide vents to atmosphere for a purpose to be described below. As shown in FIGURE 3, the valve plate 10 is connected at 10a to the lower leaf of the spring 12.

The side wall of the valve body 1 is formed with four slots 15 providing outlets for pressure fluid to be released from the pressurised suit after the pressure in said suit has reached a predetermined amount.

The valve plate 10 is shown in the closed position in FIGURE 3 and is biased to that position by the spring 12. If, through any unforseen circumstance, pressure of fluid in the pressurised garment exceeds a predetermined amount, and this is preferably 3 p.s.i., pressure builds up in the lower chamber, shown at 16, of the valve body tending to force the valve plate of 10 off its seating 7.

Due to the very light force exterted by the spring 12 to maintain the valve plate 10 on its seating, immediately pressure in the lower chamber 16 exceeds 3 p.s.i. it overcomes the bias of the spring so that the valve plate flies instantaneously off its seat. In so doing, the valve plate 10 compresses the spring 12 and, due to the provision of the vents 14, the air in the chamber 17 above the valve plate is evacuated to atmosphere. Air from the lower chamber is now able to pass into the upper chamber 17 and is deflected by the valve plate 10 to the outlets 15 in the upper part of the valve body.

Once the pressure in the pressurised garment drops below 3 p.s.i. the spring 12, assisted by the magnet 9, effects rapid reseating of the valve plate 10.

It is to be appreciated that once the valve plate 10 is forced off its seating 7, pressure fluid from the chamber 16 impinges with considerable velocity on said valve plate, and this plate then deflects the pressure fluid to the outlets 15, thereby preventing undue turbulence in the valve body. It is of importance that the relationship between the knife-edged valve seating 7 and the outlets 15 is kept within .020" of normal position as shown in FIGURE 3. Furthermore, the number and dimensions of the slotted outlets 15, together with the volume and shape of the chambers 16 and 17, must be carefully considered in order to prevent resonance occurring in the valve plate and spring, which resonance would provide undesired noise effects on the intercommunication system of the air-crew.

The provision of the air vents 14 allowing evacuation of the air in the chamber 17 prevents pressure buildup beyond the plate, thus allowing almost instantaneous opening of the valve plate.

As has been stated above, the relief valve is magnified approximately twice its actual size; the overall dimensions of the complete valve assembly is preferably 1½" diameter $9/_{16}$" thickness. The valve is so designed that the valve plate opens almost instantaneously when pressure of 3 p.s.i. is exceeded in the pressurised garment. The valve as shown in the accompanying drawing, allows flow, from the pressurised garment, of air within up to 23 to 24 cubic feet per minute, but will also handle such flow from at least .035 cubic feet per minute; it will be appreciated that when the valve plate leaves its seating, which may occur for relief of only a very small amount, the pressure relief valve is able to exhaust the small amount and then the valve plate will immediately be returned to its seating. This is an advantage over known pressure relief valves which have the undesired characteristic of staying open too long and not correctly and properly reseating, thus allowing leakage when the valve is reseated. Furthermore the provision of the knife-edged seating 7 for the valve prevents the valve ceasing to function due to any ice formation at very low temperatures within the valve body. The valve, according to the present invention is so designed that for a differential pressure between opening and closing, as small as 0.1 p.s.i. the valve will correctly reseat instantaneously and prevent further leakage.

What is claimed is:

A pressure relief valve for incorporation into a pressurized suit and having means for clamping in layer of fabric forming part of the suit to the valve, said valve comprising a body having an inlet for fluid under pressure, and outlet means for the escape of pressure fluid from within said body; a valve seat within said body between said inlet and said outlet means and being spaced inwardly throughout its seat surface from a surrounding wall of said body, said outlet means extending through said surrounding wall outwardly beyond said valve seat; a magnetic valve plate mounted normally to engage said valve seat but to move off said valve seat, said body having an end wall extending within and joined to the periphery of said surrounding wall on the side of said valve plate opposite the side thereof engageable with said valve seat and being spaced from said valve plate, said end wall having a vent aperture therein; spring means interposed between said end wall and said valve plate for biasing the latter onto its seat; a magnet mounted in said body within said valve seat on the side of said valve plate opposite said spring means for further biasing said valve plate onto said seat; and means for adjusting said magnet toward and away from said end wall.

References Cited by the Examiner
UNITED STATES PATENTS

| | | | |
|---|---|---|---|
| 517,106 | 3/1894 | Laass | 267—42 |
| 2,449,683 | 9/1948 | Akerman | 137—63 X |
| 2,646,071 | 7/1953 | Wagner | 137—528 |
| 2,895,503 | 7/1959 | Kolthoff | 137—535 |
| 2,938,540 | 5/1960 | Schatzman et al. | 251—65 X |
| 2,949,931 | 8/1960 | Ruppright | 251—65 X |
| 2,966,917 | 1/1961 | Bloom | 137—64 |
| 2,984,254 | 5/1961 | Allen | 251—65 X |

ISADOR WEIL, *Primary Examiner.*